United States Patent [19]
Brinkman

[11] Patent Number: 5,860,738
[45] Date of Patent: Jan. 19, 1999

[54] ROTARY MIXER BOWL CLAMP FOR A MIXING MACHINE

[75] Inventor: John E. Brinkman, Tipp City, Ohio

[73] Assignee: Premark FEG L.L.C., Wilmington, Del.

[21] Appl. No.: 896,224

[22] Filed: Jul. 17, 1997

[51] Int. Cl.$^6$ .................................................. B01F 15/00
[52] U.S. Cl. .................... 366/197; 248/231.41; 411/395; 292/102; 292/304
[58] Field of Search ..................................... 366/197, 198, 366/199, 203, 207; 248/231.21, 231.41, 231.71, 316.1, 316.4; 292/101, 102, 241, 304; 411/395, 82

[56] References Cited

U.S. PATENT DOCUMENTS

| | | | |
|---|---|---|---|
| 735,353 | 8/1903 | Eifert | 366/197 |
| 1,290,980 | 1/1919 | Hackstedde | 366/197 |
| 1,468,615 | 9/1923 | Guttenstein et al. | 366/207 |
| 1,707,550 | 4/1929 | Gould | 366/207 |
| 1,909,224 | 5/1933 | Schiff | 366/197 |
| 2,931,232 | 4/1960 | Martin | 366/197 |
| 4,105,344 | 8/1978 | Rousom | 269/249 |
| 4,293,056 | 10/1981 | Setree, II | 184/105 |
| 5,029,673 | 7/1991 | Arrington | 248/316.4 |
| 5,255,950 | 10/1993 | Davies | 294/103 |
| 5,547,278 | 8/1996 | Xie | 366/207 |

FOREIGN PATENT DOCUMENTS

| | | | |
|---|---|---|---|
| 850237 | 12/1939 | France | 366/197 |
| 146567 | 8/1954 | Sweden | 366/197 |
| 138812 | 2/1920 | United Kingdom . | |
| 325777 | 2/1930 | United Kingdom | 366/197 |

*Primary Examiner*—Tony G. Soohoo
*Attorney, Agent, or Firm*—Thompson Hine & Flory LLP

[57] ABSTRACT

A rotary clamp mechanism for coupling a mixing bowl to an arcuate arm of a mixer housing that continuously prohibits the build up of air borne food particles and fluids between the mating circumferential surfaces between the clamp shaft and cylindrical bore. The clamp includes a clamp shaft adapted to be mounted for rotation in a bore extending through a bowl-support arm of a mixer housing, a head positioned on the longitudinal upper end of the clamp shaft, and a jaw projection extending radially from the head, where the jaw has a lower clamping surface adapt to engage a top surface of the projection extending from the mixing bowl upon rotation of the clamp shaft. The clamp shaft includes a channel for providing fluid communication between the circumferential surface of the shaft facing the bore and the lower end surface of the shaft facing below the bore. This channel facilitates drainage of fluids entrained between the circumferential surface of the clamp shaft and the inner circumferential surface of the bore. The clamp shaft also includes an annular depression milled into the surface of the shaft that faces the bore. This annular depression substantially reduces the surface area contacts between the surface of the clamp shaft and the inner surface of the bore.

18 Claims, 2 Drawing Sheets

ROTARY MIXER BOWL CLAMP FOR A MIXING MACHINE

BACKGROUND

The present invention relates to a mixing machine, and more particularly, to a rotary mixer bowl clamp for a mixing machine.

Commercial and domestic mixers are well known for mixing food stuffs. Such mixers typically include a housing having a support assembly for supporting a drive head over a removable mixing bowl. The mixing bowl is removably coupled to an arcuate bowl support arm, which extends outward from the housing of the mixer, by a pair of rotary mixer bowl clamps. The bowl typically includes a pair of diametrically opposed projections extending radially outward from the bowl which are received on a top surface of the arcuate bowl support arm. The manually rotatable mixer bowl clamps are threadingly received within threaded bores extending through the arcuate support arm, adjacent to the positions where the projections are seated.

The clamps typically include a head component, positioned on the top of the rotary shaft; and the head includes a radially extending jaw portion, a bottom surface of which is adapted to clamp down upon a top surface of one of the radial projections extending from the bowl. The rotary clamps are designed such that rotation of the clamp in one direction simultaneously lowers the jaw and positions the jaw over the radial projection, thus clamping the projection to the arcuate arm. Rotation of the clamp in the opposite direction simultaneously raises the jaw and rotates the jaw away from the projection, thus releasing the projections from the arcuate arm and, in turn, allowing the bowl to be lifted from the bowl support.

The mixing machines typically operate in environments that contain minute airborne solid and fluid particles (i.e., flour, dust, oil, water, etc.). Such particles and fluids often tend to migrate into the mating circumferential surfaces between the cylindrical shafts of the rotatable clamps and the cylindrical bores extending through the arcuate support arm. Thus, over an extended period of time, a substantial amount of such particles and fluids tends to build up within these mating circumferential surfaces, and thus tends to interfere with the rotating operation of the clamps. Significant build-up of such particles and fluids will cause the clamp to "freeze up," thus requiring maintenance to the bowl support and clamp mechanisms.

U.S. Pat. No. 5,029,673 to Harrington describes an attempt to alleviate this problem. Arrington discloses a rotary clamp mechanism that has a rotary shaft with an axial hole extending therethrough. The axial hole includes three radial holes extending from the axial hole to the outer circumferential surface of the shaft, and the axial hole is also in fluid communication with a grease fitting adapted to be mounted to the bottom portion of the shaft. The Harrington clamp allows for the connection of a grease gun to the grease fitting, to provide grease to the axial hole, and subsequently to provide grease through the radial holes and into the mating circumferential surfaces between the cylindrical shafts of the rotatable clamps and the cylindrical bores extending through the arcuate support arm. While this system is effective to promote easier rotary motion of the clamp shaft within the cylindrical shaft, and to vent foreign particulates from entering between the mating circumferential surfaces, the system requires a continuous maintenance schedule, in which a person will have to couple a grease gun to the grease fitting and apply grease to the mechanism at regular intervals. Without such continuous maintenance, the build-up of particles between the mating circumferential surfaces (and even clogging the radial holes) may advance to such a stage that subsequent injections of grease into the mechanism may not correct the problem. Therefore, this system will be disadvantageous in many circumstances, because establishing and maintaining a continuous maintenance schedule for mixer bowl clamps in many commercial outfits and in almost all domestic situations will not occur.

Accordingly a need exists for a mixer bowl clamp mechanism that allows for extended and continuous use without the need to establish and maintain a strict maintenance schedule. A need also exists for a mixer bowl clamp mechanism that prohibits the build up of air borne food particles and fluids between the mating circumferential surfaces between the clamp shaft and cylindrical bore, without the continuous intervention of a maintenance worker.

SUMMARY

The present invention provides a rotary clamp for coupling a mixing bowl to an arcuate arm of a mixer housing that continuously prohibits the build up of air borne food particles and fluids between the mating circumferential surfaces between the clamp shaft and cylindrical bore. This is accomplished primarily by substantially reducing the surface area contact between the mating circumferential surfaces of the clamp shaft and cylindrical bore, and also by providing a means for the drainage of particles and fluids from between these mating circumferential surfaces.

The mixing bowl has a projection extending radially therefrom and the arcuate arm has a top surface for seating the projection. The cylindrical bore positioned adjacent the projection when seated on the arcuate arm extends vertically through the arcuate arm for receiving the rotary clamp mechanism. The rotary clamp mechanism includes a cylindrical clamp shaft adapted to be mounted for rotation in the bore, a head positioned on the longitudinal upper end of the clamp shaft and adapted to extend above the top surface of the arcuate arm, and a jaw projection extending radially from the head, where the jaw has a lower clamping surface adapt to engage a top surface of the projection extending from the mixing bowl upon rotation of the clamp shaft. The clamp shaft includes a lower threaded portion which engages with a threaded portion of the cylindrical bore. Upon rotation of the clamp shaft within the cylindrical bore the clamp shaft will correspondingly raise or lower itself within the bore depending upon the direction of rotation. The clamp is designed such that rotation of the clamp shaft to position the jaw over the projection, simultaneously lowers the clamp shaft with respect to the projection, thereby causing the jaw to provide pressure on the projection and thus clamp the projection to the arcuate arm.

According to one aspect of the present invention, the clamp shaft includes a channel for providing fluid communication between the circumferential surface of the shaft facing the cylindrical bore and the lower end surface of the shaft facing below the cylindrical bore. This channel facilitates drainage of fluids entrained between the circumferential surface of the clamp shaft and the inner circumferential surface of the bore.

Preferably, the cylindrical clamp shaft also includes an annular depression milled into the circumferential surface of the shaft that faces the cylindrical bore. This annular depression substantially reduces the surface area contacts between the circumferential surface of the clamp shaft and the inner circumferential surface of the bore. Accordingly, the channel for allowing the drainage of entrained fluids between the mating circumferential surfaces, in combination with the annular depression milled into the clamp shaft, will act to substantially reduce the build-up of particles and fluids entrained between the mating circumferential surfaces of the clamp shaft and bore; and furthermore, the reduced surface area between the clamp shaft and cylindrical bore substantially reduces the susceptibility of the clamp to "freezing up" between manual rotations of the clamp shaft.

Preferably, the channel includes a diametrically extending portion that extends diametrically across the clamp shaft and opens into the annular depression, and also includes an axially extending portion opening on to the lower end surface of the clamp shaft and also intersecting the radially extending portion of the channel. Thus, the channel includes at least two radial openings in fluid communication with the single axial drainage opening.

Accordingly is an object of the present invention to provide a mixing bowl clamp that facilitates the draining of fluids entrained between the mating circumferential surfaces of the mixing bowl clamp shaft and bore; it is a further object of the present invention to provide a reduced surface contact area between the mating circumferential surfaces between the mixing bowl clamp shaft and bore; and is an object of the present invention to provide a rotary mixing bowl clamp that can be used for extended periods without regular maintenance and without failure. These and other objects and advantages of the present invention will be apparent from the following description, the accompanying drawings and the appended claims.

DETAILED DESCRIPTION

The present invention will be described with respect to a planetary mixing machine 10 as exemplified in FIG. 1. However, it would be apparent to those of ordinary skill in the art that any type of commercial or domestic mixing machine or other apparatus utilizing the clamp mechanism of the present invention will fall within the scope of the invention.

Figure 1:
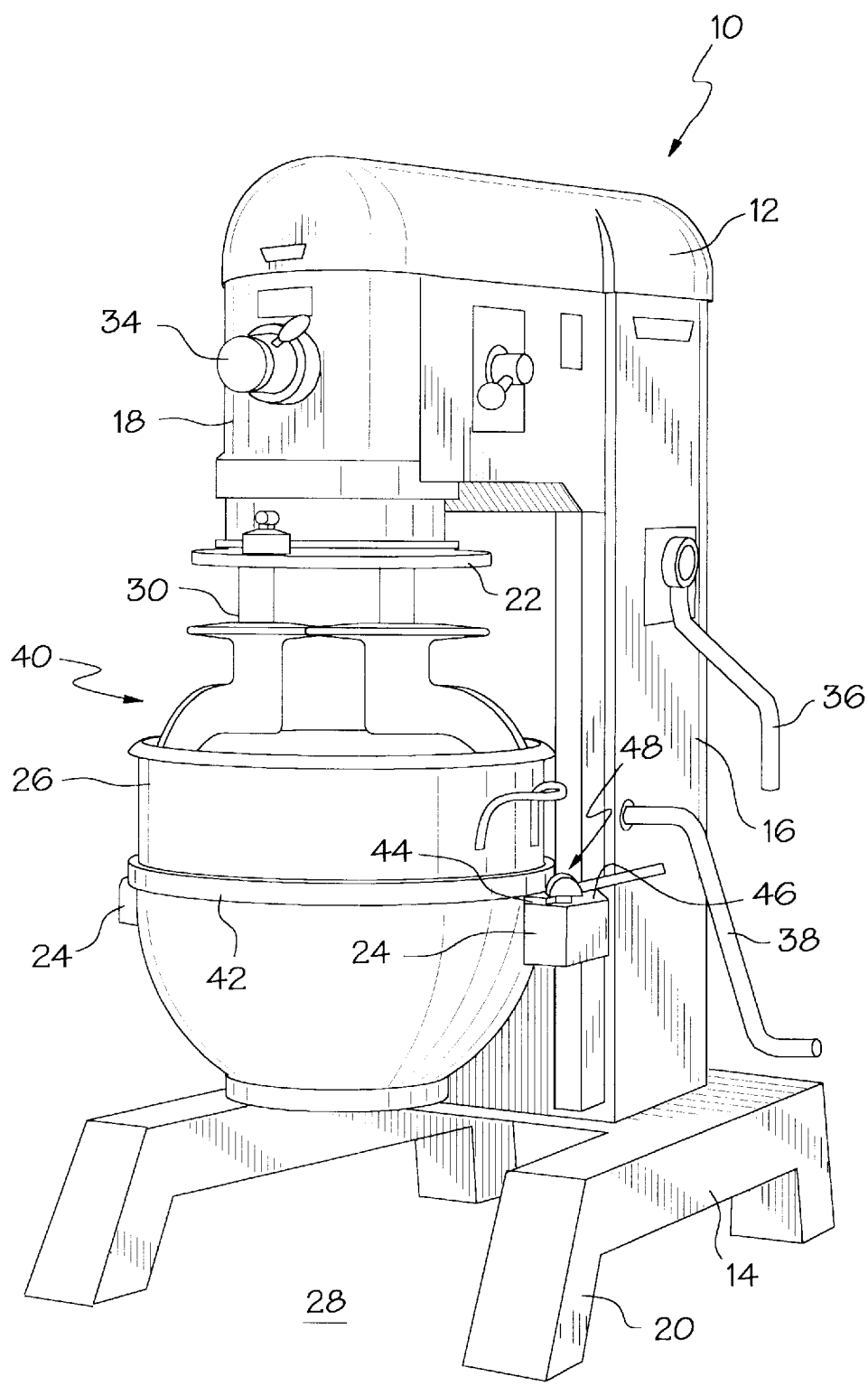
FIG. 1 is a perspective view of a mixing machine for use with the present invention.

As shown in FIG. 1, the mixing machine 10 includes a base 14, a supporting structure 16, and an mixer head support assembly 18 projecting from the upper end of the supporting structure 16. The base 14 is formed by two pairs of space legs 20. The support structure 16 extends vertically from the base and the mixer head support assembly 18 projects horizontally from the support structure 16 over the space between the pair of legs 20. The mixer head support structure 18 carries a mounting member 22 for a mixing tool. The mixture 10 further includes an arcuate bowl support arm 24 mounted to the support structure 16. The arcuate bowl support arm 24 defines a recess to receive a complimentary, removable bowl 26, which is to contain the substance to be mixed by the mixing machine. The arcuate support arm 24 holds the bowl 26 a distance above the surface 28 upon which the legs 20 rest.

The mixer head support assembly 18 houses the appropriate reduction systems, bearings, transmission systems, gearing, etc. (not shown) as are known in the art. Such systems are driven by a motor (not shown) housed within the structure 16 and are adapted to drive a shaft (not shown), coupled to the mounting member 22, such that the mounting member 22 rotates about its own axis and, at the same time, orbits around a main vertical axis.

The mixer 10 also includes a mixing attachment drive head 30, auxiliary attachment port 34 and a shaft lever assembly 36. Mixing attachment drive head 30 extends from the mounting 22 of the mixer head support assembly 18 and drives a detachably mounted dough hook or agitator 40.

The arcuate bowl support arm 24 supports the mixing bowl 26 directly beneath the mixing attachment drive head 30. A crank 38 is rotatably mounted to the housing 12 and is operatively coupled to a gear system that is used to raise and lower the bowl 26 into position beneath the mixing attachment drive head 30.

The mixing bowl 26 includes an annular rib 42 positioned approximately midway along the axial length of the bowl; and the rib 42 includes two diametrically opposed radial projections 44 (one shown), each extending radially outward from the rib 42 and the outer circumferential surface of the bowl. Each projection 44 rests on a top surface 46 of the arcuate support arm 24. Two manually operable, rotary mixer-bowl clamp mechanisms 48 (one shown) are provided. Each clamp mechanism 48 is mounted for rotation within the arcuate bowl support arm 24, adjacent to each of the projections 44 radially extending from the bowl 26. As will be described in further detail below, the clamp mechanisms 48 are used to clamp the projections 44 to the top surface 46 of the arcuate support arm 24.

Figure 2:
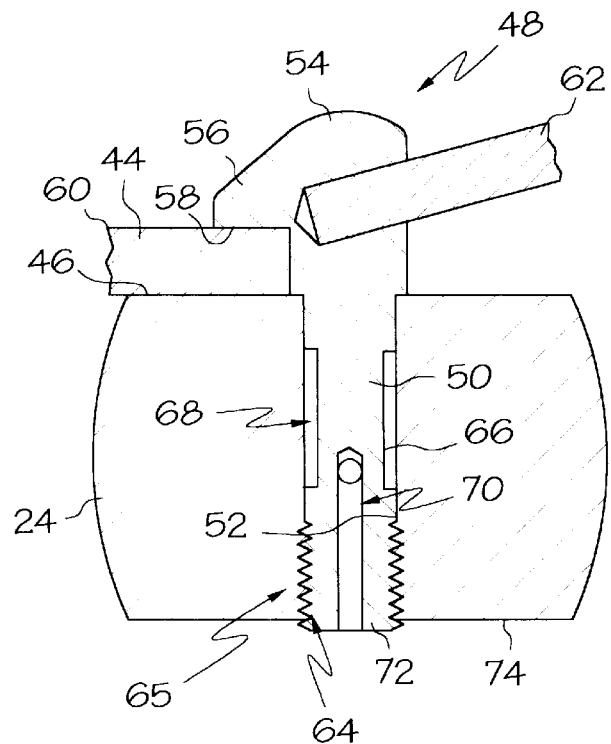
FIG. 2 is a cross-sectional side view of a rotary mixer bowl clamp mechanism of the present invention.
Figure 3:
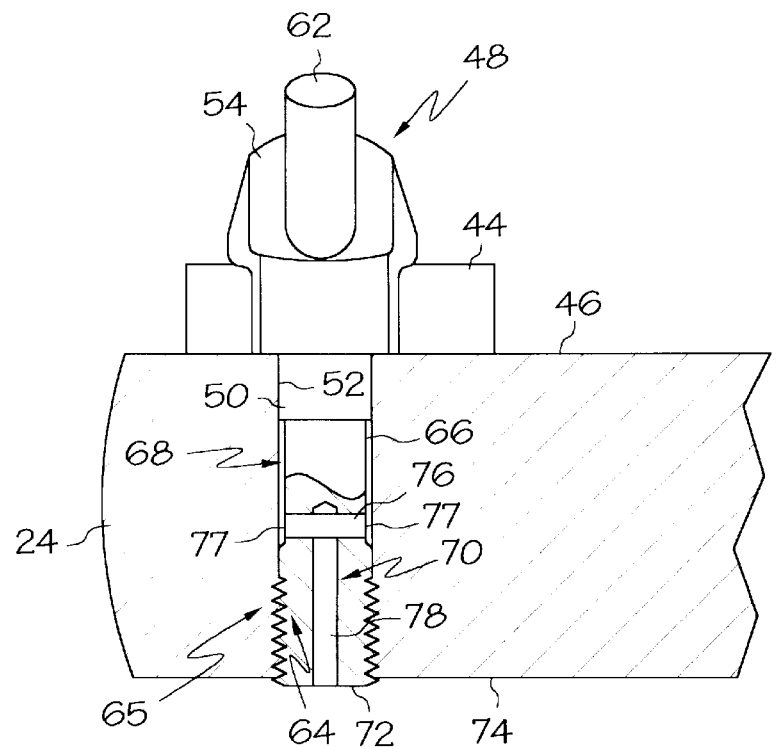
FIG. 3 is a partial cross-sectional rear view of the rotary mixer bowl claim mechanism of FIG. 2.

As shown in FIGS. 2 and 3, each of the clamp mechanisms 48 include a cylindrical clamp shaft 50 rotatably mounted in a cylindrical bore 52 extending through the arcuate bowl support arm 24. The clamp mechanisms further include a head 54, positioned on a longitudinal upper end of the clamp shaft 50, and adapted to extend above the top surface 46 of the arcuate support arm; and a jaw 56 extending radially from the head 54. The jaw 56 includes a lower clamping surface 58 adapted to engage and clamp down upon an upper surface 60 of the projection 44 upon rotation of the clamp shaft 50 within the cylindrical bore 52. The clamp mechanism 48 also includes a handle 62 extending outwardly from the head 54, preferably in an opposite direction from the jaw 58. The handle provides a grip for manual manipulation and rotation of the clamp shaft 50 within the cylindrical bore 52.

The cylindrical clamp shaft 50 includes a lower threaded portion 64 adapted to engage with a lower threaded portion 65 of the cylindrical bore 52. Therefore, rotation of the clamp shaft in a direction to bring the jaw 56 over the projection 44 also acts to lower the clamp shaft 50, and in turn the jaw 56 such that the jaw presses down upon the projection 44 and such that the projection 44 is "clamped" to the arcuate support arm 24. Likewise, rotation in an opposite direction, to rotate the jaw 56 away from the projection, acts to simultaneously lift the jaw 56 over the projection, thus releasing the projection 44 from the arcuate support arm 24.

The clamp shaft 50 includes an annular depression or recessed portion 66 milled into the circumferential surface of the clamp shaft, which substantially reduces the surface area contacts between the circumferential outer surface of the cylindrical clamp shaft 50 in the inner cylindrical surfaces of the cylindrical bore 52. Accordingly, when the clamp 48 is mounted within the cylindrical bore 52, a cavity 68 is formed between the recessed portion 66 and the inner cylindrical surface of the bore 52.

A channel 70 is bored into the cylindrical clamp shaft 50 to provide fluid communication between the cavity 68 and the bottom portion 72 of the clamp shaft facing downward below the bottom surface 74 of the arcuate support arm 24. The channel preferably includes a diametrically extending portion 76 having diametrically opposed openings 77 facing onto two diametrically opposed portions of the cavity 68, and an axial portion 78 extending axially into the bottom 72 of the cylindrical shaft 50 and extending upward to intersect with the diametrically extending portion 76, thus providing fluid communication between the diametrically extending portion 76 and the axially extending portion 78. Preferably, the openings 77 are positioned adjacent the bottom of the cavity 68 to ensure optimal flow of liquids from the cavity 68 into the channel 70.

It is within the scope of the invention to provide a similar channel for providing fluid communication between the circumferential surface of the cylindrical shaft 50 and a inner circumferential surface of the bore 52 without the presence of the cavity 68. Likewise it is also within the scope of the invention to provide the cavity 68 without providing a channel 70 as described above. It is also within the scope of the invention to provide the recess 66 within the circumferential surface of the cylindrical bore 52, rather than the circumferential surface of the shaft 50.

Preferably, the recessed portion 66 has a width that is 75% of the longitudinal length of the clamp shaft 50. However, it is within the scope of the invention to provide a annular recessed portion 66 having an operable width between 50% and 85%. Additionally, it is within the scope of the invention to provide at least one or a multitude of radial openings into the channel 70, positioned at one or several vertical positions along the cylindrical clamp shaft 50.

In summary, the annular recessed portion 66 substantially reduces the surface area contact between the cylindrical shaft 50 and the cylindrical bore 52 thereby substantially reducing the susceptibility of the clamp 48 to "freezing up" between manual rotations of the clamp shaft 50 within the bore 52. Additionally, the channel 70 facilitates the drainage of fluids and food particles or other particles entrained in between the clamp shaft 50 and cylindrical bore 52, thereby substantially reducing the build-up of foreign matter within the bore 52, and in turn, substantially increasing the longevity and operability of the clamp 48.

Having described the invention in detail and by reference to the drawings, it will be apparent that modification and variations are possible within departing from the scope of the invention as defined in the following claims.

What is claimed is:

1. A rotary clamp for coupling a mixing bowl to a bowl-support arm of a mixer housing, the mixing bowl having a projection extending radially therefrom, the arm having a top surface for supporting the projection and a cylindrical bore extending vertically through the arm for receiving the rotary clamp, the rotary clamp mechanism, for clamping the projection to the top surface of the arm, comprising:

a cylindrical clamp shaft adapted to be mounted for rotation in said bore and having a circumferential side surface;

a head positioned on a longitudinal upper end of said clamp shaft and adapted to extend above said top surface of said arm; and a jaw projection extending radially from said head, said jaw having a lower clamping surface adapted to engage a top surface of said projection extending from the mixing bowl, upon rotation of said clamp shaft;

said clamp shaft having a lower end surface and a circumferential surface, said clamp shaft including a channel providing fluid communication between said circumferential surface and said lower end surface;

whereby said channel facilitates drainage of fluids entrained between said circumferential surface of said clamp shaft and an inner circumferential surface of said bore.

2. The rotary clamp of claim 1, wherein:

said circumferential surface of said clamp shaft includes an annular depression; and said channel opens onto said annular depression.

3. The rotary clamp mechanism of claim 2, wherein said bore has a longitudinal length, and said annular depression has a vertical width approximately 75% said longitudinal length of said bore.

4. The rotary clamp mechanism of claim 2, wherein said channel includes a radially extending portion opening onto said annular depression and an axially extending portion opening onto said lower end surface of said clamp shaft, said radially extending portion and said axially extending portion intersecting one another within said clamp shaft.

5. The rotary clamp mechanism of claim 4, wherein:

said radially extending portion extends diametrically through said clamp shaft and has two diametrically opposed openings onto said annular depression; and said axially extending portion intersects said radially extending portion substantially midway between said diametrically opposed openings.

6. The rotary clamp mechanism of claim 5, further comprising a handle extending from said head, adapted to allow hand manipulation of the rotary clamp by a human operator.

7. The rotary clamp mechanism of claim 1, wherein said circumferential surface of said clamp shaft includes at least one annular notch adapted to substantially reduce surface area contact between said clamp shaft and an inner circumferential surface of said bore.

8. The rotary clamp mechanism of claim 7, wherein said circumferential surface of said clamp shaft includes a plurality of said annular notches and said channel opens onto an outer circumferential surface of one of said annular notches.

9. The rotary clamp mechanism of claim 8, wherein said bore has a longitudinal length, each of said annular notches has a vertical width, and the sum of said vertical widths are approximately 75% said longitudinal length of said bore.

10. A rotary clamp for coupling a mixing bowl to a bowl-support arm of a mixer housing, the mixing bowl having a projection extending radially therefrom, the arm having a top surface for supporting the projection and a cylindrical bore extending vertically through the arm for receiving the rotary clamp, the rotary clamp mechanism, for clamping the projection to the top surface of the arm, comprising:

a cylindrical clamp shaft adapted to be mounted for rotation in said bore and having a circumferential side surface;

a head positioned on a longitudinal upper end of said clamp shaft and adapted to extend above said top surface of said arcuate arm; and a jaw projection extending radially from said head, said jaw having a lower clamping surface adapted to engage a top surface of said projection extending from the mixing bowl, upon rotation of said clamp shaft;

said clamp shaft having an annular depression adapted to substantially reduce surface area contact between said clamp shaft and an inner circumferential surface of said bore.

11. A mixing machine comprising:

a mixing head;

a mixing bowl having a radial projection extending outwardly therefrom;

a mixing bowl support arm for supporting said mixing bowl under said mixing head, said support arm having a top surface for seating said mixing bowl projection thereon and including a cylindrical bore extending vertically therethrough and opening onto said top surface, said cylindrical bore having a circumferential inner surface; and a rotary clamp for clamping said mixing bowl projection to said support arm, including,
- a cylindrical clamp shaft mounted for rotation in said bore and having an outer circumferential surface adjacent said inner circumferential surface of said bore and having a lower end surface;
- a head positioned on a longitudinal upper end of said clamp shaft and extending above said top surface of said support arm; and
- a jaw projection extending radially outward from said head, said jaw having a lower clamping surface adapted to engage a top surface of said mixing bowl projection upon rotation of said clamp shaft;

said clamp shaft including a channel providing fluid communication between said circumferential side surface of said clamp shaft and said lower end surface of said clamp shaft;

whereby said channel facilitates drainage of fluids entrained between said circumferential side surface of said clamp shaft and an inner circumferential surface of said bore.

12. The mixing machine of claim 11, wherein:

said inner circumferential surface of said bore has a first diameter;

said circumferential side surface of said clamp shaft has a second diameter approximately equal to, but slightly smaller than said first diameter; and said clamp shaft further includes an annular depression, having an outer surface with a diameter substantially smaller than said second diameter.

13. The mixing machine of claim 12, wherein said channel opens onto said outer surface of said annular depression.

14. The mixing machine of claim 13, wherein said bore has a longitudinal length, and said annular depression has a vertical width approximately 75% said longitudinal length of said bore.

15. The mixing machine of claim 14, wherein said channel includes a radially extending portion opening onto said annular depression and an axially extending portion opening onto said lower end surface of said clamp shaft, said radially extending portion and said axially extending portion intersecting one another within said clamp shaft.

16. The mixing machine of claim 15, wherein:

said radially extending portion extends diametrically through said clamp shaft and has two diametrically opposed openings onto said annular depression; and said axially extending portion intersects said radially extending portion substantially midway between said diametrically opposed openings.

17. The mixing machine of claim 11, wherein said circumferential surface of said clamp shaft includes at least one annular notch adapted to substantially reduce surface area contact between said clamp shaft and an inner circumferential surface of said bore.

18. A mixing machine comprising:

a mixing head;

a mixing bowl having a radial projection extending outwardly therefrom;

a mixing bowl support arm for supporting said mixing bowl under said mixing head, said support arm having a top surface for seating said mixing bowl projection thereon and including a cylindrical bore extending vertically therethrough and opening onto said top surface, said cylindrical bore having an inner circumferential surface; and a rotary clamp for clamping said mixing bowl projection to said support arm, including,
- a cylindrical clamp shaft mounted for rotation in said bore and having an outer circumferential surface adjacent said inner circumferential surface of said bore and having a lower end surface;
- a head positioned on a longitudinal upper end of said clamp shaft and extending above said top surface of said support arm; and
- a jaw projection extending radially outward from said head, said jaw having a lower clamping surface adapted to engage a top surface of said mixing bowl projection upon rotation of said clamp shaft;

an annular depression extending into said outer circumferential surface of said clamp shaft or into said inner circumferential surface of said bore, adapted to substantially reduce surface area contact between said outer circumferential surface of said clamp shaft and an inner circumferential surface of said bore.

* * * * *